Dec. 29, 1931.   A. N. THOMAS   1,838,199
ADJUSTABLE SEAT
Filed Nov. 10, 1928
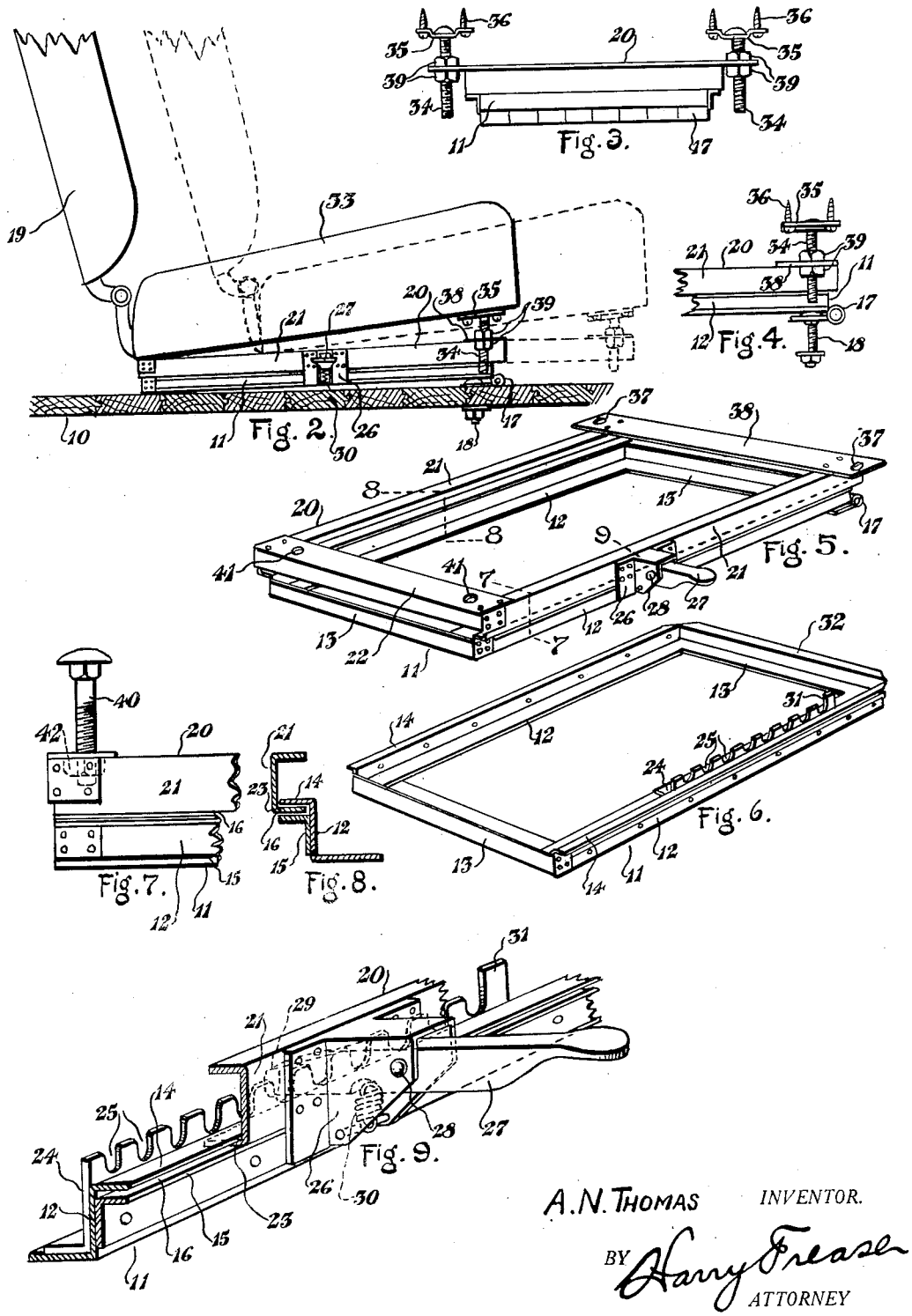
A. N. THOMAS   INVENTOR.
BY Harry Frease
ATTORNEY Patented Dec. 29, 1931

1,838,199

UNITED STATES PATENT OFFICE

ARVINE N. THOMAS, OF CANTON, OHIO

ADJUSTABLE SEAT

Application filed November 10, 1928. Serial No. 318,329.

The invention relates to adjustable seats for use in automobiles and the like, and particularly to a seat especially adapted for use in automobile coaches of the two-door type provided with a folding front seat to permit access to the rear seat.

The object of the improvement is to provide a seat of this character formed of two frames, the lower frame being hingedly connected at one end to the floor of the automobile or the like, the upper frame being slidable upon the lower frame and provided with means for holding the same in adjusted position thereon.

An embodiment of the invention is illustrated in the accompanying drawings, in which Figure 2 is a side elevation of the improved seat;

Fig. 3, a front end view of the improved frame to which the invention pertains;

Fig. 4, a fragmentary detail elevation of one front corner of the frame;

Fig. 5, a perspective view of the frame;

Fig. 6, a detached sectional view of the lower frame;

Fig. 7, a detail elevation of one rear corner of the frame;

Fig. 8, a section on the line 8—8, Fig. 5; and

Fig. 9, an enlarged fragmentary detail section, showing the adjusting means for the upper or sliding frame.

Similar numerals refer to similar parts throughout the drawings.

The floor of an automobile coach or the like is indicated generally at 10 and the lower or hinged frame is indicated generally at 11, being rectangular in shape and formed of angle members 12 and 13 comprising the sides and ends thereof.

The side members 12 have the outturned flanges 14 at their upper edges and spaced below the same, angle members 15 are welded or otherwise connected to the outer sides of the frame members 12, providing a channel or groove 16 between the same and the outturned flanges 14.

A hinge 17 is connected to the forward lower edge of the lower frame and is adapted to be attached to the floor 10 of the automobile as by the bolts 18. Thus when the back 19 is folded down upon the seat, the frame may be swung forward and upward upon the hinge as is customary in seats of this general type, in order to permit a person to enter or leave the rear seat.

The upper frame shown generally at 20 is formed of the side members 21 of channel shape and the end members 22, which may be of angle cross section. The lower flange 23 of each channel side member is slidably located in the channel or groove 16 between the upper flange 14 of the lower frame and the angle member 15 so that the upper frame may be slidably moved longitudinally with relation to the lower frame.

In order to hold the upper frame in any desired adjusted position, an angle plate 24 may be welded or otherwise connected to the inner side of one of the side members 12 of the lower frame, this plate being provided at its upper edge with spaced notches 25.

An inverted U-shaped bracket 26 is fixed upon the outer side of one of the side members 21 of the upper frame and may be connected substantially at the center thereof, as illustrated in the drawings, or at any other desired point on the frame.

A lever 27 is pivoted, intermediate its ends, as at 28, upon the bracket and the inner end 29 of the lever is normally urged into engagement with one of the notches 25 as by a pull spring 30.

An upright lug 31 may be formed at one end of the plate 24 to limit the movement of the upper frame in one direction and for the purpose of limiting the same in the other direction, an outturned flange 32 may be formed at the upper edge of one of the end members 13 of the lower frame for contact with the adjacent end member 22 of the upper frame.

The seat proper, indicated generally at 33, may be vertically adjustably mounted upon the upper frame as by the adjusting bolts 34 connected to attaching plates 35 adapted to be fastened to the under side of the forward end portion of the seat as by screws 36.

These adjusting bolts pass through openings 37 in the attaching plate 38 fixed on top of the forward end portion of the upper frame and are adapted to be held in adjusted position as by the nuts 39.

The rear end portion of the seat proper may be attached to the rear portion of the top frame as by bolts 40 passed downward through the apertures 41 in the rear end member 22 of the upper frame and provided with nuts 42.

From the above it will be seen that the seat proper may be adjusted vertically upon the upper or sliding frame, to give the same any desired angular position and the upper frame may be moved longitudinally upon the lower frame, as indicated in dotted lines in Fig. 2, and held in adjusted position by means of the lever 27 and notched plate 24.

When it is desired to swing the seat forward upon its hinge, the upper frame should first be returned to the normal position shown in full lines in Fig. 2.

I claim:

1. An adjustable seat including a normally stationary frame, a movable frame slidably mounted upon the stationary frame, a seat carried by the movable frame, a notched plate fixed to one side of the stationary frame, an inverted U-shaped bracket upon the adjacent side of the movable frame, a lever fulcrumed upon said bracket and having an inner end and an outer end, its inner end arranged to selectively engage any of the notches in the notched plate, the outer end of the lever extending outward beyond the adjacent side of the movable frame and forming a handle for sliding the movable frame upon the stationary frame and for engaging and disengaging the inner end of the lever with the notched plate, and a spring operatively associated with the lever and bracket for normally holding the lever in engagement with the notched plate.

2. An adjustable seat including a normally stationary frame, a movable frame slidably mounted upon the stationary frame, a seat carried by the movable frame, a notched plate fixed to one side of the stationary frame, a bracket fixed upon the adjacent side of the movable frame and having a spaced pair of walls extending outward beyond said side of the movable frame, a lever located between the walls of the bracket and fulcrumed thereon and having an inner end and an outer end, the inner end of the lever being arraged to selectively engage any of the notches in the notched plate, the outer end of the lever extending outward beyond the adjacent side of the movable frame and forming a handle for sliding the movable frame upon the stationary frame and for engaging and disengaging the inner end of the lever with the notched plate, and a pull spring connected to the inner portion of the lever and to the lower portion of the bracket for normally holding the lever in engagement with the notched plate.

In testimony that I claim the above, I have hereunto subscribed my name.

ARVINE N. THOMAS.